United States Patent
Lovell, Jr.

(10) Patent No.: US 8,311,538 B2
(45) Date of Patent: Nov. 13, 2012

(54) SYSTEM AND METHOD FOR ENHANCED CONTENT ACCESS

(75) Inventor: Robert C. Lovell, Jr., Leesburg, VA (US)

(73) Assignee: Sybase 365, Inc., Reston, VA (US)

( * ) Notice: Subject to any disclaimer, the term of this patent is extended or adjusted under 35 U.S.C. 154(b) by 0 days.

(21) Appl. No.: 12/944,856

(22) Filed: Nov. 12, 2010

(65) Prior Publication Data

US 2011/0059743 A1    Mar. 10, 2011

Related U.S. Application Data

(63) Continuation of application No. 12/776,890, filed on May 10, 2010, which is a continuation-in-part of application No. 11/263,799, filed on Nov. 2, 2005, now abandoned.

(60) Provisional application No. 60/623,861, filed on Nov. 2, 2004.

(51) Int. Cl.
*H04W 4/00* (2009.01)
*H04W 40/00* (2009.01)
*H04M 7/00* (2006.01)

(52) U.S. Cl. ... 455/433; 455/445; 455/466; 379/221.13; 379/220.01; 379/221.09

(58) Field of Classification Search .................. 455/445, 455/433, 435.1, 466, 432.1; 379/220.1, 221.13, 379/221.09
See application file for complete search history.

(56) References Cited

U.S. PATENT DOCUMENTS

| | | | |
|---|---|---|---|
| 5,537,474 | A | 7/1996 | Brown et al. |
| 5,701,301 | A | 12/1997 | Weisser, Jr. |
| 5,867,788 | A | 2/1999 | Joensuu |
| H1837 | H | 2/2000 | Fletcher et al. |
| 6,055,437 | A | 4/2000 | Riley et al. |
| 6,167,129 | A * | 12/2000 | Fikis et al. ............ 379/230 |
| 6,181,939 | B1 | 1/2001 | Ahvenainen |
| 6,397,064 | B1 | 5/2002 | Bridges et al. |
| 6,618,588 | B1 | 9/2003 | Easley |
| 6,799,017 | B1 | 9/2004 | Kregel |
| 7,283,831 | B2 | 10/2007 | Caldini et al. |
| 7,672,267 | B2 * | 3/2010 | Tsai et al. ............ 370/328 |
| 7,860,498 | B2 * | 12/2010 | Lovell et al. ............ 455/433 |
| 2002/0086675 | A1 | 7/2002 | Mansour |
| 2003/0061234 | A1 | 3/2003 | Ali et al. |
| 2003/0171119 | A1 | 9/2003 | McIntosh |
| 2004/0082332 | A1 | 4/2004 | McCann et al. |
| 2005/0113095 | A1 * | 5/2005 | Allison ............ 455/445 |
| 2010/0303063 | A1 | 12/2010 | Gibson |

* cited by examiner

*Primary Examiner* — Wesley Kim
(74) *Attorney, Agent, or Firm* — Edell, Shapiro & Finnan, LLC

(57) ABSTRACT

A method and system for facilitating HLR access includes receiving a query request from a query entity, processing the query request to yield an SS7 request message, dispatching the SS7 request message to a HLR, receiving an SS7 response message from the HLR, constructing a query response, and returning the query response to the query entity.

13 Claims, 4 Drawing Sheets

SYSTEM AND METHOD FOR ENHANCED CONTENT ACCESS

This application is a continuation of U.S. application Ser. No. 12/776,890, filed May 10, 2010, which is a continuation-in-part application of U.S. application Ser. No. 11/263,799, filed Nov. 2, 2005, which claims the benefit of U.S. Provisional Patent Application No. 60/623,861, filed on Nov. 2, 2004, all of which are incorporated herein by reference in their entireties.

BACKGROUND

1. Field of the Invention

The present invention relates generally to telecommunications services. More particularly, the present invention facilitates the issuance of inquiries to, along with the appropriate processing of responses that are received from, Home Location Register (HLR) facilities and other similarly-situated facilities.

2. Background of the Invention

A wireless telecommunications environment contains a number of different elements. While the precise nature, makeup, organization, etc. of the elements within a particular environment may vary depending upon the technology at play—e.g., Global System for Mobile communications (GSM), Code Division Multiple Access (CDMA), Time Division Multiple Access (TDMA), etc.—the portions of a wireless telecommunications environment that are of interest and importance to the present discussion may be illustrated through the high-level 'generalized' diagram (of a portion of a hypothetical Wireless Carrier's [WC's] environment) that is presented in FIG. 1.

As appropriate and as required, additional more detailed information may be obtained from any number of sources including, inter alfa, references such as "Wireless and Mobile Network Architectures" by Lin and Chlamtac (John Wiley & Sons, Inc., 2001) and on-line treatises.

For purposes of completeness the following elements are noted in the high-level diagram that is presented in FIG. 1:

A) Mobile Subscriber (MS) 102. For example, a user of a cellular telephone.

B) Base Station (BS). A logical aggregation of, for example, controller (e.g., Base Station Controller [BSC]) functionality and transmitter/receiver (e.g., Base Transceiver Station [BTS]) functionality that realizes a 'cell' which services one or more MSs. Four BSs are depicted in FIG. 1—BSa 112 (along with its cell 104), BSb 114 (along with its cell 106), BSc 118 (along with its cell 110), and BSd 116 (along with its cell 108).

C) Mobile Switching Center (MSC) 128. A specialized switching system that, in the instant depiction, supports or services the four BSs BSa 112, BSb 114, BSc 118, and BSd 116 (through the connections 120, 122, 126, and 124 respectively).

D) Visitor Location Register (VLR) 130. A repository containing selected temporary or transient information for those specific MSs that are currently being serviced by the VLR's associated MSC 128.

E) HLR 132. A permanent repository containing identifying, profile, subscription, etc. information for all of the MSs within the instant WC's environment.

Each MS Wireless Device (WD) that is supported by a WC may have a logical record in the WC's HLR. Such a logical record:

(1) May be keyed, indexed, etc. by one or more identifiers that are associated with the WD—e.g., the WD's TN (perhaps Mobile Directory Number [MDN] or Mobile Station International ISDN Number [MSISDN]), an International Mobile Subscriber Identity (IMSI), etc., and (2) May contain a wide range of MS-specific and WD-specific information including possibly inter alia MS identifying information, MS preferences, MS account status, services (such as for example roaming, [SMS, MMS, etc.] messaging, enhanced data facilities such as General Packet Radio Service [GPRS], call forwarding, call waiting, caller identification, etc.) that are enabled, WD capabilities and characteristics, an identifier of the MSC that currently services the WD (based on the WD's current physical location), etc.

F) Signaling System Number 7 (SS7) Cloud 134. Access to the various interconnected SS7 networks.

G) Public Switched Telephone Network (PSTN) Cloud 136. Access to the various interconnected public (land-line, etc.) telecommunications networks.

H) Land Subscriber (LS) 138. For example, a user of a fixed- or land-line telephone.

Central amongst the elements that are depicted in the hypothetical WC's environment in FIG. 1 is the HLR facility 132. A WC's HLR serves as something of a 'magic decoder ring' of sorts from which key MS information may be retrieved and through which critical activities may be completed. Illustrative uses include, inter alia:

A) Confirming that a WC does in fact currently own or service a MS. This is of critical importance given, for example, the increasing presence of Number Portability (NP) regimes.

B) Confirming the specific services, options, etc. that a MS has elected and for which (e.g., based on things such as current account balances, etc.) a MS is presently eligible.

C) Ascertaining the current physical location of a MS (e.g., what MSC currently services the MS) and, as a consequence, identifying the viable routing and call/message delivery options that are available at that moment in time.

D) Ascertaining whether a MS is currently roaming outside of, or away from, her home WC.

E) Supporting the proper routing and delivering of telephone calls.

F) Supporting the proper routing and delivering of (e.g., Short Message Service [SMS] and Multimedia Message Service [MMS] and other) messages.

An HLR is typically accessed via SS7. As a result, the various activities that were described in A→F above are commonly accomplished through an exchange of Mobile Application Part (MAP) and other request and response SS7 messages. One specific MAP message that is of interest is the SendRoutingInformation (SRI) message, which is:

1) Realized as LocationRequest or LOCREQ (and defined in the Telecommunications Industry Association [TIA]/Electronic Industries Alliance [EIA]-41-D specification) for an American National Standards Institute (ANSI) flavor of SS7 (as used domestically).

2) Realized as MAP_SEND_ROUTING_INFO (and defined in the International Telecommunication Union [ITU] Q.771-Q.775 specifications) for an ITU flavor of SS7 (as used internationally).

Access to a WC's HLR is typically very tightly controlled by the WC. This is due partly to the critical importance of an HLR (as described above), partly to the mechanism that is used to access an HLR (typically involving the execution of reciprocal business agreements and the explicit granting of permissions and access rights via a trusted SS7 network), and partly to the sensitive MS-specific information and other proprietary business information that is housed in an HLR.

As noted above, a logical HLR record for a particular MS WD may contain a wide range of MS-specific and WD-specific information. A WC may consider certain aspects of that information (such as for example MS account status) to be proprietary business information that among other things the WC does not wish to disclose to outside entities. As well a WC may consider other aspects of that information (such as for example a WD's TN) to be public information that among other things the WC does not mind disclosing to outside entities.

Thus the conundrum . . . . How does an interested entity (e.g., a third-party message delivery service) efficiently and seamlessly gain access to a range of WC's HLRs? The present invention provides a solution.

SUMMARY OF THE INVENTION

According to one exemplary aspect, the present invention relates to a method for facilitating HLR access, comprising receiving a query request from a query entity, performing one or more processing steps on the query request yielding an SS7 request message, dispatching the SS7 request message to a HLR, receiving an SS7 response message from the HLR, performing one or more processing steps on the SS7 response message yielding a query response, and returning the query response to the query entity.

According to another exemplary aspect of the present invention, a system is disclosed for facilitating HLR access. The system includes a query entity, a query request, a query response, and an administration and management interface. The system is operable to accept a query request from a query entity, generate an SS7 request message, dispatch the SS7 request message to a HLR, receive an SS7 response message from the HLR, generate a query response, and dispatch the query response to the query entity, all under the control of operating rules that are dynamically configurable through an administration and management interface.

These and other features of embodiments of the present invention will be more fully explained below in conjunction with the drawings.

DETAILED DESCRIPTION

To better understand the particulars of the present invention consider for a moment the following hypothetical example. In this example, which is illustrated at a high-level by the diagram that is presented in FIG. 2, the present invention serves as a key portion of a comprehensive 'routing engine.' A complete description of the features, capabilities, etc. of aspects of an illustrative 'routing engine' facility, a Message Routing Subsystem (MRS), may be found in pending U.S. patent application Ser. No. 10/831,329 (entitled "AN INTERMEDIARY NETWORK SYSTEM AND METHOD FOR FACILITATING MESSAGE EXCHANGE BETWEEN WIRELESS NETWORKS" filed with the U.S. Patent and Trademark Office [USPTO] on 26 Apr. 2004), and which is herein incorporated by reference in its entirety.

Our hypothetical routing engine, which in the instant example is offered under an Application Service Provider (ASP)-like model, provides authoritative, real-time answers to queries such as 'At this precise moment in time what WC owns or services the MS that resides at 1-703-555-1212?'

Figure 1:
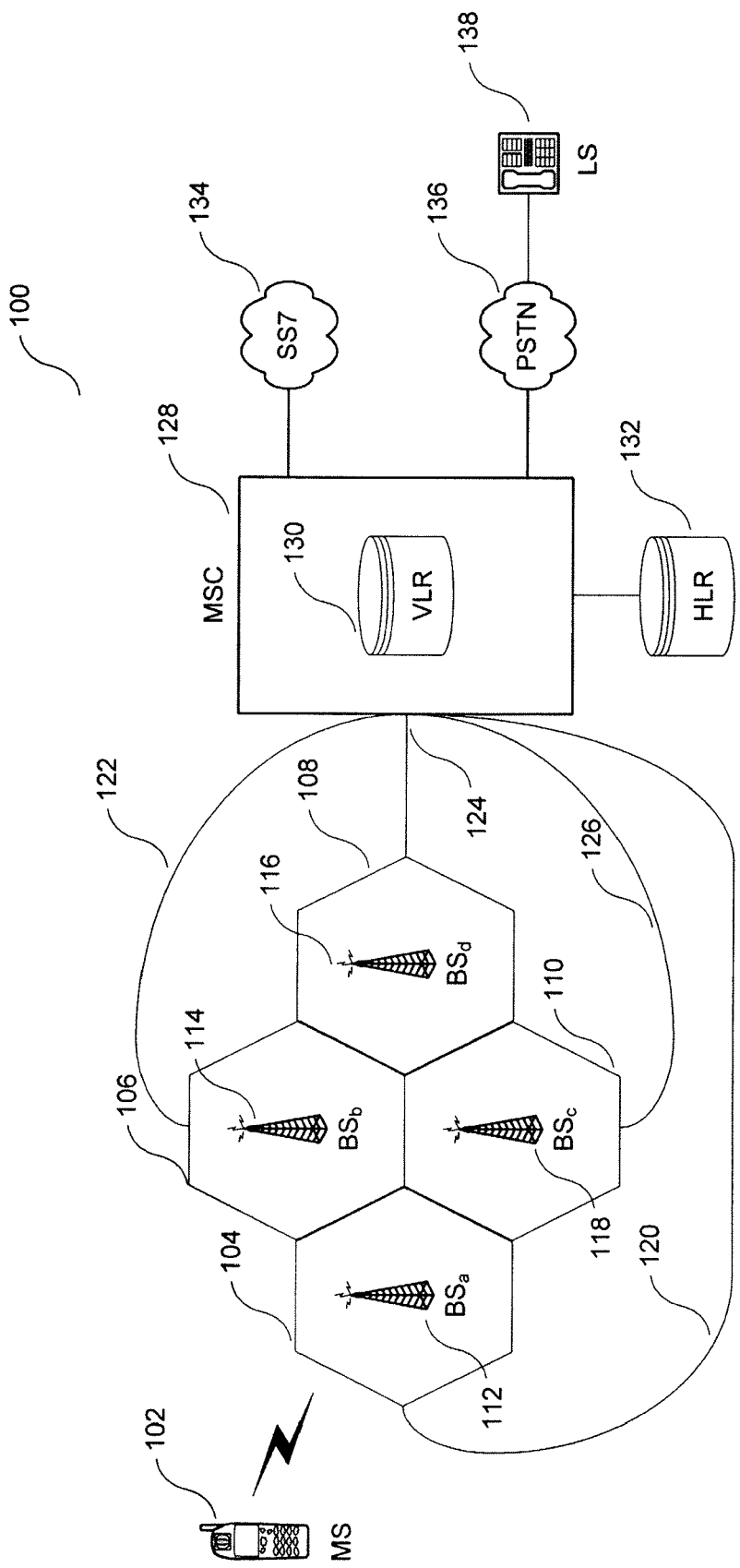
FIG. 1 presents a high-level generalized diagram of a portion of a hypothetical WC's environment.
Figure 2:
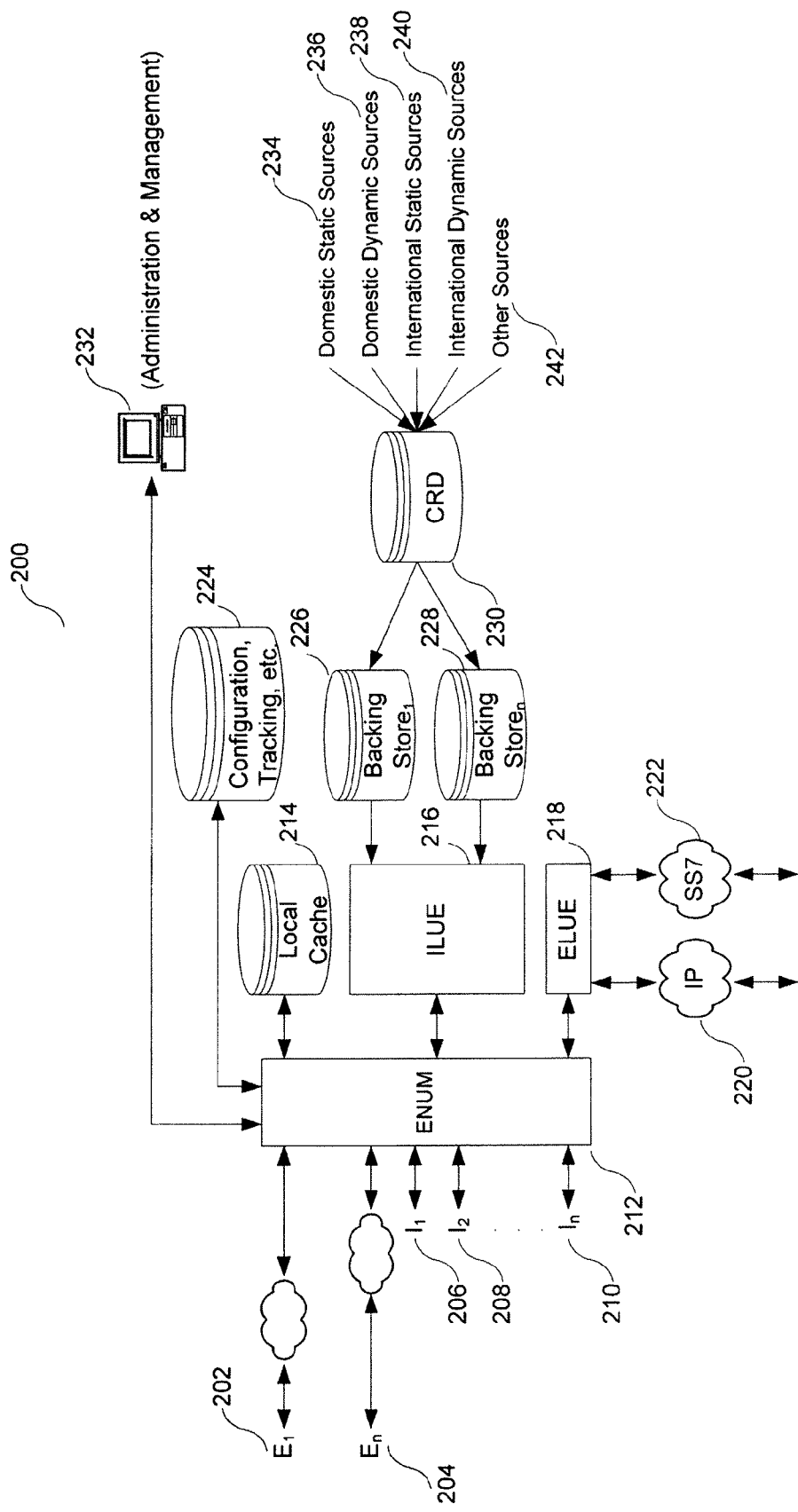
FIG. 2 presents a high-level framework through which aspects of the instant invention may be illustrated.

Referring to the diagram that is presented in FIG. 2, entities that are external to the ASP (E1 202→En 204), including for example third-party message processing services, and entities that are within the ASP (I1 206→In 210), including for example elements of the ASP's own message delivery service (s), connect with and submit inquiries to a consolidated Electronic Numbering (ENUM) facade 212. The ENUM facade 212 abstracts away and otherwise isolates a range of behind-the-scenes complexities, including:

A) A (e.g., Web-based) user interface 232 that provides comprehensive administration and management capabilities.

B) A repository 224 containing (a) dynamically-updatable configuration and control information and (b) real-time usage and tracking information to support, inter alia, the possible billing of the external and/or internal entities (i.e., E1 202→En 204 and I1 206→In 210 respectively).

C) A local cache 214, wherein retrieved results may be optionally preserved for subsequent re-use. Additionally, configurable rules for the use of the cache and configurable logic controlling the aging and expiration of cache entries.

D) An Internal LookUp Engine (ILUE) 216 through which the contents of the environment's Composite Routing Data (CRD) repository 230 may be accessed via one or more intermediate backing stores (Backing Store1 226→Backing Storen 228).

E) An External LookUp Engine (ELUE) 218 through which external lookup, Telephone Number (TN) translation, etc. facilities (including, inter alia, foreign NP databases) may be accessed.

The various external (E1 202→En 204) and internal (I1 206→In 210) entities may communicate with the ENUM facade using any number of mechanisms including, inter alia, a simple text-based request/response protocol, or a more robust (e.g., Extensible Markup Language [XML]-based) request/response protocol, riding atop a secured or an unsecured Internet Protocol (IP)-based or other channel. As one illustrative example, an external entity might communicate with the ENUM facade through an XML-based Application Programming Interface (API) over a secure HyperText Transfer Protocol (HTTP) connection while an internal entity (by benefit of it being internal) might communicate with the ENUM facade through an XML-based API over a regular HTTP connection. It will be readily apparent to one of ordinary skill in the relevant art that numerous other arrangements are easily possible.

It is important to note that while two specific communications approaches are illustrated for the ELUE—IP-based 220 and SS7-based 222—it will be readily apparent to one of ordinary skill in the relevant art that the addition of other communications approaches is easily possible.

It is important to note that the indicated repositories or stores (Configuration 224, Local Cache 214, Backing Store1 226→Backing Storen 228, CRD 230, etc.) may be physically realized through any combination of, inter alia, traditional Relational DataBase Management System (RDBMS) solutions, in-memory database solutions, proprietary solutions, etc.

Amongst other things, the ILUE 216 and ELUE 218 facilities encapsulate all of the data (through, for example, the CRD 230), application logic, etc. that is necessary to support, inter alia, all of the different TN numbering plans/schemes that are found around the world and all of the different NP regimes that are active around the world. These are, without risk of overstatement, not-insignificant matters.

Using the service framework that was presented above, it is through the FLUE 218 facility that the present invention may be found. Focusing just on an SS7-based 222 communications model (but recognizing that other, for example IP-based 220, communication models are easily possible) we turn to the high-level diagram that is presented in FIG. 3.

Figure 3:
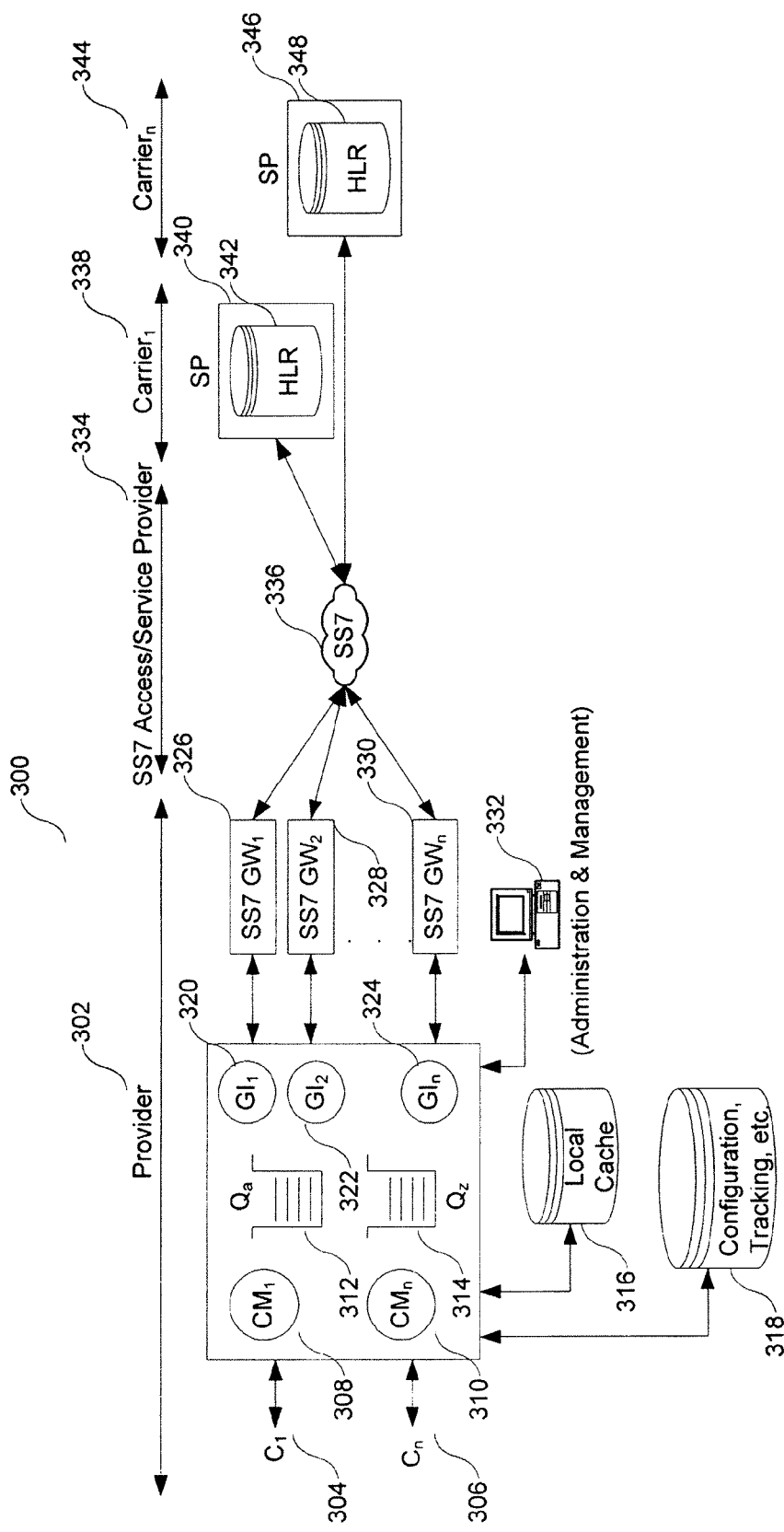
FIG. 3 presents a high-level illustration of one embodiment of the instant invention.

As depicted in the diagram that is presented in FIG. 3, an array of Connection Manager (CM) processes (CM1 308→CMn 310) support connections (C1 304→Cn 306) with query entities; for example, an ELUE. Through an intermediate set of queues (Q1 312→Qn 314), which help to balance any fluctuations/etc. in the flow of incoming queries and outgoing responses, an array of Gateway Interface (GI) processes (GI1 320→GIn 324) communicate with mated SS7 Gateway (GW) instances (SS7 GW1 326→SS7 GWn 330) to:

A) Retrieve a request for a query (e.g., 'What WC owns or services the MS that resides at 1-703-555-1212?') from a queue (Q1 312→Qn 314).

B) Construct an outgoing SRI request SS7 message containing, possibly amongst other data elements or values, the TN (e.g., Mobile Directory Number [MDN] or Mobile Station International ISDN Number [MSISDN]) of the instant MS.

C) Dispatch the outgoing SRI request message to an SS7 GW instance (GI1 320→GIn 324) for subsequent routing and delivery to the destination WC's (Carrier1 338→Carriern 344) HLR facility (HLR 342→HLR 348) via the SS7 cloud 336.

D) Receive an incoming SRI response SS7 message from the SS7 GW (GI1 320→GIn 324).

E) Extract key data elements, including possibly amongst other data elements the (e.g., E.164) address of the MSC that is currently servicing the instant MS, from the received SRI response SS7 message.

F) Create a query response construct and populate it with the data elements that were extracted from the received SRI response SS7 message.

G) Deposit the completed query response construct on a queue (Q1 312→Qn 314) for retrieval and subsequent return to the query initiator.

A (e.g., Web-based) user interface 332 provides comprehensive administration and management capabilities. Additionally, a dynamically-updatable repository 318 of configuration and control information is available.

Figure 4:
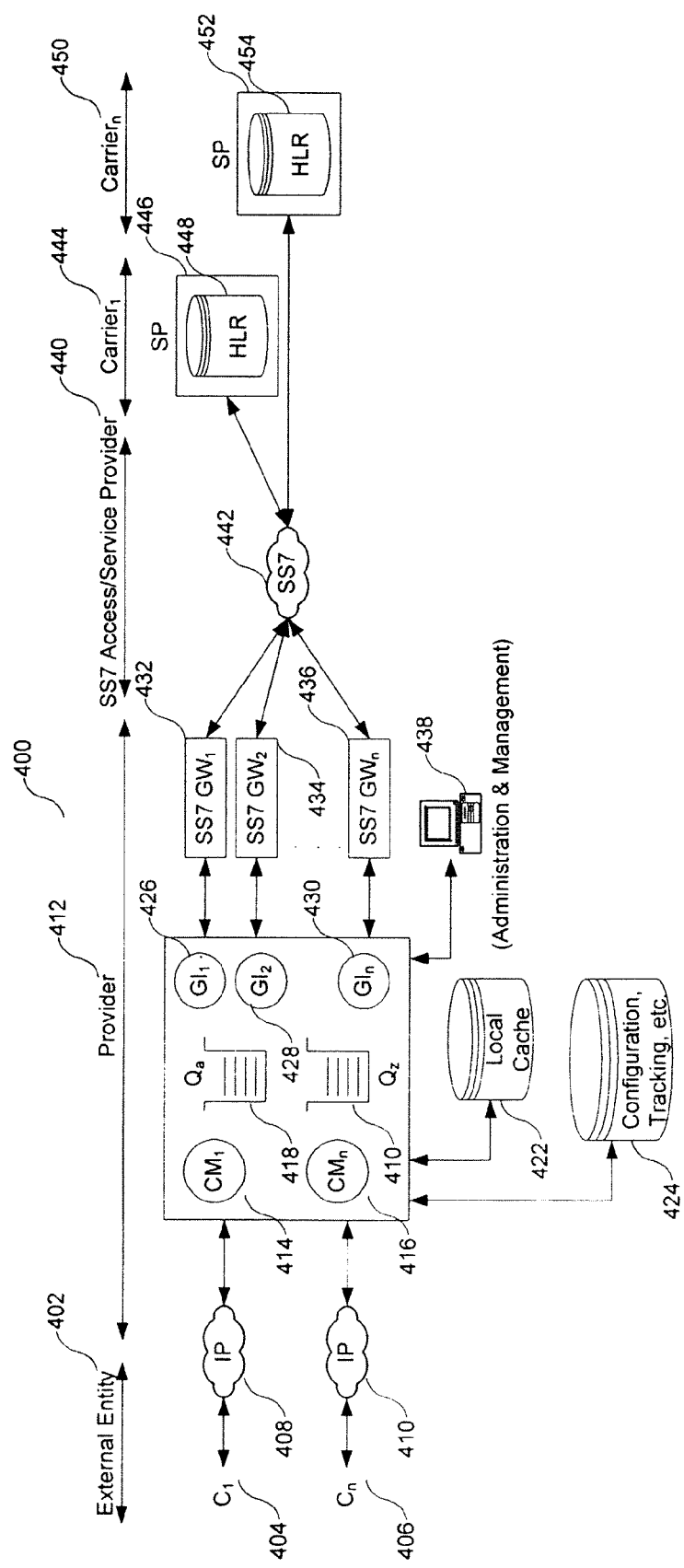
FIG. 4 presents a high-level illustration of another embodiment of the instant invention.

FIG. 3 depicted an environment operating within the confines of a service provider (ASP) 302 for example potentially as one of several facilities supporting an ELUE. An alternative embodiment, supporting external query entities, may be illustrated by the diagram that is presented in FIG. 4. As depicted in the diagram that is presented in FIG. 4, an array of CM processes (CM1 414→CMn 416) support connections (C1 404→Cn 406) with external query entities; for example, various message routing/delivery components within a third-party's messaging service. The balance of the diagram that is presented in FIG. 4 is the same as corresponding portions of the diagram that is presented in FIG. 3 and therefore explanation (for the balance of the diagram that is presented in FIG. 4) may be found in the FIG. 3 narrative that was presented above.

Thus the present invention provides something of a 'screen' behind which individual WCs may reside. Consider the simple case of numerous WCs and a single ASP that has implemented the present invention:

A) A WC may establish a business relationship with, and subsequently execute all of the necessary (non-trivial) reciprocal agreements with, a single trusted entity (i.e., the ASP).

B) A WC may grant, and subsequently manage, access rights, privileges, permissions, etc. to their HLR to a single trusted entity (i.e., the ASP).

C) The ASP may optionally redact (based on dynamically updatable configuration or control information) portions of the data that is returned from a WC's HLR before populating a query response construct (thus protecting HLR information that a WC may deem to be confidential or otherwise sensitive).

Additionally an ASP may (1) optionally map, transform, manipulate, etc. portions of the data that is returned from a WC's HLR and possibly include aspects of those operations (e.g., portions of the results of a mapping operation, portions of the results of a transformation operation, etc.) in a query response construct and (2) optionally include in a query response construct other static or dynamic information. For example, in the case of the query 'What WC owns or services the MS that resides at 1-703-555-1212?' an ASP may, after possibly inter alia dispatching a request message to an HLR and receiving a response message from the HLR and completing various processing operations, populate a query response construct with possibly among other things the specified TN (i.e., 1-703-555-1212), a coded value (e.g., 132, WC23, etc.) that identifies the WC that owns or services the TN, and a success/failure status indicator.

D) The ASP may track each and every query request/response exchange and subsequently bill each initiating query entity. One or more of the WCs that reside behind the ASP's 'screen' may optionally share in the revenue (through various dynamically configurable fund distribution schemes including, inter alia, flat-rate, simple percentage, complex percentage, etc.) that the ASP realizes.

E) The ASP may absorb changes by WCs in HLR access models or paradigms (e.g., as WCs implement new protocols, etc. such as IP, SS7-over-IP, Signaling Transport [SigTran], etc.).

In the facilities that were described above (FIG. 3 and FIG. 4) a query entity, either internal (FIG. 3) or external (FIG. 4), may communicate with a CM (CM1 308→CMn 310 in FIG. 3 and CM1 414→CMn 416 in FIG. 4) process through any number of mechanisms. For example, communication may take place through an XML-based API over an HTTP connection (possibly regular HTTP for internal entities, secure HTTP for external entities). It will be readily apparent to one of ordinary skill in the relevant art that numerous other mechanisms, along with alternative arrangements/etc. within a particular mechanism, are easily possible.

In the facilities that were described above (FIG. 3 and FIG. 4) the intermediate queues (Q1 312→Qn 314 in FIG. 3 and Q1 418→Qn 420 in FIG. 4) may be configured to operate under any number of models or paradigms including, inter alia, First In First Out (FIFO), Last In First Out (LIFO), custom, etc. Additionally, individual queue entries may optionally be assigned a priority number or level to facilitate different queue entry retrieval orders (in support of, for example, free and/or fee-based value-add Quality of Service [QoS] offerings).

In the facilities that were described above (FIG. 3 and FIG. 4) a local cache (316 in FIG. 3 and 422 in FIG. 4) may optionally be employed. Such a cache may be used to hold or preserve retrieved results for subsequent re-use and would include, possibly amongst other items, the cache repository itself, configurable rules for the use of the cache, and configurable logic controlling the aging and expiration of cache entries.

In the facilities that were described above (FIG. 3 and FIG. 4) it is important to note that the indicated repositories or stores (Configuration [318 in FIG. 3 and 424 in FIG. 4], Local Cache [316 in FIGS. 3 and 422 in FIG. 4], etc.) may be physically realized through any combination of, inter alia, traditional RDBMS solutions, in-memory database solutions, proprietary solutions, etc.

In the facilities that were described above (FIG. 3 and FIG. 4) a GI process (GI1 320→Gin 324 in FIG. 3 and GI1 426→Gin 430 in FIG. 4) was mated to an SS7 GW instance (SS7 GW1 326→SS7 GWn 330 in FIG. 3 and SS7 GW1 432→SS7 GWn 436 in FIG. 4). Under an alternative embodiment, since the underlying SS7 messaging is in fact idempotent, each GI process (GI1 320→Gin 324 in FIG. 3 and GI1 426→GIn 430 in FIG. 4) could be disassociated from a SS7 GW instance (SS7 GW1 326→SS7 GWn 330 in FIG. 3 and SS7 GW1 432→SS7 GWn 436 in FIG. 4) and a GI process (GI1 320→GIn 324 in FIG. 3 and GI1 426→Gin 430 in FIG. 4) could employ a select-a-GW instance (SS7 GW1 326→SS7 GWn 330 in FIG. 3 and SS7 GW1 432→SS7 GWn 436 in FIG. 4) as needed model (under which a GI process [GI1 320→Gin 324 in FIG. 3 and GI1 426→GIn 430 in FIG. 4] would momentarily 'attach' itself to an available SS7 GW instance [SS7 GW1 326→SS7 GWn 330 in FIG. 3 and SS7 GW1 432→SS7 GWn 436 in FIG. 4] when it needs to dispatch an outgoing SS7 message and a SS7 GW instance [SS7 GW1 326→SS7 GWn 330 in FIG. 3 and SS7 GW1 432→SS7 GWn 436 in FIG. 4] would momentarily 'attach' itself to a GI process [GI1 320→GIn 324 in FIG. 3 and GI1 426→GIn 430 in FIG. 4] when it needs to hand-off an incoming SS7 message). Under such an alternative model techniques such as, for example, unique GI process ID values and unique SS7 GW ID values and a dynamically-updatable ID mapping facility would be used to 'tie together' SS7 request messages and their associated responses.

In the facilities that were described above (FIG. 3 and FIG. 4) ANSI, ITU, and/or a mixture of ANSI and ITU SS7 GWs (SS7 GW1 326→SS7 GWn 330 in FIG. 3 and SS7 GW1 432→SS7 GWn 436 in FIG. 4) may be employed. The SS7-facing side of each SS7 GW preferably isolates and thus abstracts away all of the SS7 complexities—including, inter alia, SS7 Point Code (PC) format, structure, and assignment; the specific SS7 cloud that is to be used (should multiple clouds be available); adjacent SS7 Signaling Point (SP) addresses; etc.—thereby facilitating the operation of a mixed (ANSI and ITU) environment.

Under one possible embodiment of the present invention the outbound SS7 messages that are generated may optionally benefit from the type or sort of dynamic message addressing capabilities that are described in pending U.S. patent application Ser. No. 11/137,351 (entitled "SYSTEM AND METHOD FOR INTELLIGENT DYNAMIC MESSAGE ADDRESSING" and filed with the USPTO on 26 May 2005) which is herein incorporated by reference in its entirety.

While the discussion above included one particular type of SS7 message exchange—an outgoing SRI request message and an incoming SRI response message—it will be readily apparent to one of ordinary skill in the relevant art that numerous alternatives (including possibly inter alia different message types, different message sequences, etc.) are easily possible.

It is important to note that the hypothetical example that was presented above, which was described in the narrative and which was illustrated in the accompanying figures, is exemplary only. It will be readily apparent to one of ordinary skill in the relevant art that numerous alternatives to the presented example are easily possible and, indeed, are fully within the scope of the present invention.

The following list defines the acronyms as used in this disclosure.

| Acronym | Meaning |
| --- | --- |
| ANSI | American National Standards Institute |
| API | Application Programming Interface |
| ASP | Application Service Provider |
| BS | Base Station |
| BSC | Base Station Controller |
| BTS | Base Transceiver Station |
| CDMA | Code Division Multiple Access |
| CM | Connection Manager |
| CRD | Composite Routing Data |
| E.164 | International telecommunication numbering plan |
| EIA | Electronic Industries Alliance |
| ELUE | External LookUp Engine |
| ENUM | Electronic Numbering |
| FIFO | First In First Out |
| GI | Gateway Interface |
| GSM | Global System for Mobile communications |
| GW | GateWay |
| HLR | Home Location Register |
| HTTP | HyperText Transfer Protocol |
| IP | Internet Protocol |
| ILUE | Internal LookUp Engine |
| ITU | International Telecommunication Union |
| LIFO | Last In First Out |
| LS | Land Subscriber |
| MAP | Mobile Application Part |
| MDN | Mobile Directory Number |
| MRS | Message Routing Subsystem |
| MS | Mobile Subscriber |
| MSC | Mobile Switching Center |
| MSISDN | Mobile Station International ISDN Number |
| NP | Number Portability |
| PC | Point Code |
| PSTN | Public Switched Telephone Network |
| QoS | Quality of Service |
| RDBMS | Relational Database Management System |
| SigTran | Signaling Transport |
| SRI | Send Routing Information |
| SMS | Short Message Service |
| SP | Signaling Point |
| SS7 | Signaling System Number 7 |
| TDMA | Time Division Multiple Access |
| TIA | Telecommunications Industry Association |
| TN | Telephone Number |
| USPTO | U.S. Patent and Trademark Office |
| VLR | Visitor Location Register |
| WC | Wireless Carrier |
| XML | Extensible Markup Language |

What is claimed is:

1. A method for resolving a Telephone Number (TN) of a mobile device, comprising:

(a) receiving at a first gateway a query request from a query entity, the query request comprising the TN, wherein the request is received by means of other than Signaling System 7 (SS7) and is received at a node having both SS7 facing elements and non-SS7 facing elements;

(b) constructing an SS7 SendRoutingInformation (SRI) request message, the SS7 SRI request message comprising the TN;

(c) sending the SS7 SRI request message via one of the SS7 facing elements;

(d) receiving at a second gateway an SS7 SRI response message;

(e) performing one or more processing steps on the SS7 SRI response message, including at least developing an indicator of the wireless carrier that services the TN;

(f) constructing a query response, the query response comprising the indicator of the wireless carrier that services the TN; and (g) sending the query response to the query entity via one of the non-SS7 facing elements.

2. The method of claim 1, wherein the query request is accounted for monetarily.

3. The method of claim 1, wherein aspects of the results of performing the one or more processing steps on the SS7 SRI response message are preserved in a repository.

4. The method of claim 1, wherein the query response further comprises an indicator of the current physical location of the mobile device.

5. A system for resolving a Telephone Number (TN) of a mobile device, comprising:

a first gateway including non-Signaling System 7 (SS7) facing elements, a second gateway including Signaling System 7 (SS7) facing elements, a computing platform, and a repository; wherein the first gateway is configured to receive a query request from a query entity, the query request comprising the TN;

the computing platform is configured to construct and send, via one of the SS7 facing elements, an SS7 SendRoutingInformation (SRI) request message, the SS7 SRI request message comprising the TN;

the second gateway is configured to receive an SS7 SRI response message; and the computing platform is further configured to perform one or more processing steps on the SS7 SRI response message, including at least (1) developing an indicator of the wireless carrier that services the TN, (2) constructing a query response, the query response comprising the indicator of the wireless carrier that services the TN, (3) sending, via one of the non-SS7 facing elements, the query response to the query entity, and (4) preserving aspects of the one or more processing steps in the repository.

6. The system of claim 5, wherein the query request is accounted for monetarily.

7. The system of claim 5, wherein the query response further comprises an indicator of the current physical location of the mobile device.

8. The system of claim 5, wherein the query response is sent in accordance with a non-SS7 protocol.

9. A method for resolving a Telephone Number (TN) of a mobile device, comprising:

(a) receiving at a first gateway a query request from a query entity, the query request comprising the TN, wherein the query request is received by means of other than Signaling System 7 (SS7) and received at a non-SS7 facing element;

(b) identifying a Home Location Register (HLR) based on the TN;

(c) constructing an SS7 SendRoutingInformation (SRI) request message, the SS7 SRI request message comprising the TN;

(d) sending, via an SS7 facing element, the SS7 SRI request message to the HLR;

(e) receiving at a second gateway an SS7 SRI response message, the SS7 SRI response message comprising a set of data;

(f) performing one or more processing steps on the SS7 SRI response message, including at least (i) redacting a portion of the set of data, the portion of the set of data comprising proprietary business information that is housed in the HLR and deemed to be confidential by a wireless carrier to which the HLR belongs, yielding redacted data and (ii) developing an indicator of the wireless carrier that services the TN, yielding a query response, the query response comprising one or both of aspects of the redacted data and the indicator of the wireless carrier that services the TN; and (g) sending, via the non-SS7 facing element, the query response to the query entity, wherein the query entity does not have authorization to directly access the HLR.

10. The method of claim 9, wherein the query request is accounted for monetarily.

11. The method of claim 9, wherein aspects of the results of performing the one or more processing steps on the SS7 SRI response message are preserved in a repository.

12. The method of claim 9, wherein the query response further comprises an indicator of the current physical location of the mobile device.

13. The method of claim 9, wherein the query response is sent in accordance with a non-SS7 protocol.

* * * * *